United States Patent [19]

Noding et al.

[11] Patent Number: 5,057,565

[45] Date of Patent: * Oct. 15, 1991

[54] SOLID POLYELECTROLYTE POLYMER FILM

[75] Inventors: Stephen A. Noding, Brusly, La.; Sanford A. Siegel, Sarasota, Fla.

[73] Assignee: The Dow Chemical Company, Midland, Mich.

[ * ] Notice: The portion of the term of this patent subsequent to Dec. 22, 2004 has been disclaimed.

[21] Appl. No.: 283,744

[22] Filed: Dec. 22, 1988

[51] Int. Cl.$^5$ .................... C08K 5/15; H01M 10/36
[52] U.S. Cl. .................... 524/109; 524/114; 524/290; 524/308; 524/403; 524/405; 524/413; 429/127; 429/167

[58] Field of Search ............... 524/109, 119, 290, 308, 524/403, 405, 413; 429/127, 162, 192, 194, 199, 212, 213

[56] References Cited

U.S. PATENT DOCUMENTS 4,714,665 12/1987 Siegel et al. .................... 429/192
4,728,588 3/1988 Noding et al. .................... 429/127

FOREIGN PATENT DOCUMENTS 84107618.5 6/1984 European Pat. Off. .

Primary Examiner—Kriellion S. Morgan

[57] ABSTRACT

This invention relates to a solid polyelectrolyte polymer film which comprises a polymer, a plasticizer for the polymer, an epoxidized vegetable oil, and an electrolyte.

20 Claims, No Drawings

SOLID POLYELECTROLYTE POLYMER FILM

BACKGROUND OF THE INVENTION

This invention relates to a solid polyelectrolyte polymer film comprised of a single polymer sheet or film which contains electrochemical species and which can be used as a static dissipative film, or be connected to current collectors on each of its two sides, forming a secondary battery.

Most simple salts are not good electrical conductors. However, a variety of solids have high ionic conductivities which range from hard, refractory materials, such as sodium beta-alumina, through softer materials, such as silver iodide (AgI), to the very soft polymer electrolytes. Stoichiometric (AgI), nonstoichiometric (sodium $\beta$-alumina), or doped compounds (calcia-stabilized zirconia) are included in the list. Most electrically conductive metals have values above $10^5$; whereas, insulating materials have typical values lower than $10^{-16}$ (ohm-cm)$^{-1}$.

At temperatures above 150 degrees C., silver iodide shows increased electrical conductivity which results from movement of silver cations. This can be shown by placing silver electrodes on either side of a silver iodide pellet. After the desired amount of time, the silver plates were reweighed. The negative plate gained silver while the positive plate lost silver, and that difference was the same as expected if silver cations carried the charge. It has been reported that even ionic solids such as sodium chloride have some electrical conductivity that are not electronic but ionic.

A model of how crystal lattice defects can promote ionic motion (diffusion) over long molecular distances has been proposed by Shriver et al., Solid State Electronics, 5, '83 (1982). If ionic solids had perfect ordered structure, every lattice site would be occupied by the appropriate ion. However, every structure is not perfect. Defects arise when ions exist in interstitial sites or when vacancies exist in sites which are normally filled. Frenkel disorder is defined as the hopping of ions through a series of interstitial sites, and Schottky disorder is defined as the hopping of vacancies through normal lattice positions. These disorders produce ionic conductivity in solids.

Many studies have shown that most crystalline inorganic electrolytes exhibit this behavior. All have a low-conductivity phase in which the ions are ordered. They exist in subsets of lattice sites. At higher temperatures these ions become disordered and ionic conductivity is increased. High conductivity depends on how fast ionic migration (transport) occurs. If the energy needed to disrupt ions in the available sites and needed to transport ions to vacant sites in the disordered phase is low, high ionic conductivities will result.

Compounds which contain a subset of ions which are located among a large group of vacant sites can undergo fast ionic transport if there is enough energy to disorder the ions among the available sites and if the energy is great enough to move ions from filled to vacant sites. If these energies are low, then, the conductivity can be high. Such a compound is betaalumina. For example, the sodium/sulfur battery operates utilizing this principle at 300 degrees C. A sodium beta-alumina ceramic tube is used to separate the molten sodium positive electrode from the molten sulfur negative electrode. Sodium is oxidized during discharge at the sodium/sodium beta-alumina interface. The resultant sodium cation is transported through the beta-alumina (solid electrolyte) where it eventually combines with reduced sulfur in the outer chamber to form sodium polysulfide. The sulfur electrode contains enough carbon to make it electronically conducting. During the charging mode, this process if reversed.

In all electrochemical cells, whether they are batteries or sensors, the electrolyte is essential since the principle electrochemistry occurs at the interface between the electrodes and the electrolyte. At the interface, a metal atom (electrode) can be oxidized to a metal cation which can enter the electrolyte while metal cations from the electrolyte can be incorporated into the other electrode such as titanium disulfide. Therefore, the electrolyte's role is to provide a path for the migration or diffusion of ions from one electrode to the other. This flow of charge can be offset or balanced by the flow of electrons through an external circuit. For example, a battery or a sensor requires that the electrolyte cannot conduct electrons or be electronic conductive. If it does conduct electrons, the battery would discharge (short-out) as it stands. In other words, the electrolyte must be a good ionic conductor and a very poor electronic conductor.

The primary reason why solid-state batteries have not been very successful is the dimensional changes which take place in the electrodes during charging and discharging. For example, a lithium negative electrode oxidizes as the battery discharges which slowly strips lithium metal away from the metal-electrolyte interface. If the interface cannot deform to maintain good interfacial contact, the battery will fail. Also, the insertion of lithium cations into the titanium disulfide positive electrode can swell the electrode which also diminishes interfacial contact. Instead of using hard, crystalline solid electrolytes which loose interfacial contact during discharge, soft, flexible polymeric electrolytes could deform or flow and continually maintain interfacial contact with the electrodes. Polymeric electrolytes can also be cast as thin films which can lower the resistance of the electrolyte, its volume and weight.

In an attempt to solve this problem and reduce the dimensions of secondary batteries, recent battery research has turned to the use of polymeric films in secondary batteries. See European patent application No. 84107618.5 June 30, 1984. The use of polymeric films can provide batteries having very thin crosssections and decreased weight.

In a further improvement, Noding et al. U.S. Pat. No. 4,714,665, teaching a three-layer polymeric film secondary battery, and U.S. Pat. No. 4,728,588, teaching a single polymer film layer in a secondary battery, provide additional diminution of the dimensions of the film layers. It has now been recognized that the polymeric film containing the electrolyte species used in the inventions of the foregoing patents is a separate and heretofore unclaimed invention.

It is therefore an object of this invention to provide a novel solid polyelectrolyte polymer film, which is useful in a secondary battery which incorporates the utilization of a single polymeric film and which, as a result, has a very thin cross-section even when constructed of a plurality of cells.

THE INVENTION

This invention provides a solid polyelectrolyte polymer film comprised of: a polymer; a plasticizer for the polymer; an epoxidized vegetable oil; and electrolyte disassociatingly solubilized in the plasticizer, such as a conventional electrolyte or a salt having the formula MXhd a wherein X is chloride, bromide or iodide; M is a metal ion having a reduction-oxidation potential greater than that of X; and a is the oxidation number of M.

The electrolyte can be any conventional electrolyte which is soluble in the plasticizer constituent of the polymer and which does not deleteriously affect the polymer film properties or the plasticizing function of the plasticizer. Especially suitable electrolytes are alkali metal tetraphenylborates and thiocyanates. Most preferred of these are sodium tetraphenylborate and lithium and sodium thiocyanate. Since these electrolytes are salts, their concentrations in the polymer film should not be so high that the polymer film is rendered electronically conductive. For example, it has been found that, when sodium tetraphenylborate is the electrolyte, di(triethylene glycol butylether) terephthalate is the plasticizer, poly(vinyl chloride) is the polymer, and the film thickness is within the range of from about 2 to about 20 mils, the sodium tetraphenylborate is preferably present in an amount of about 1 weight percent based upon the total weight of the polymer film. Sodium tetraphenylborate amounts above about 7 weight percent generally render the polymer film so electronically conductive that, for example, a short will occur between the electronically conductive polymer films of a secondary battery made from such film, thus rendering it of little use.

The $MX_a$ salt is preferably Zn, an alkali metal or an alkaline earth metal salt. Preferred of these are Li, Ca, Na, Zn and Mg. The halide constituent is preferably iodide as the use of chloride, bromide or fluoride results in a loss of these halides from the film because of their gaseous evolution therefrom. The selection of the M and X couple is, in all cases, such that the reduction-oxidation potential of M is greater than that for X. The difference in potential is preferably greater than 0.5 volts, as a smaller difference does not provide a voltage which would be useful to adequately power most present day devices. Salts exhibiting relatively high voltage output for the secondary battery of this invention are $CaI_2$ and LiI.

It is desirable to maximize the amount of electrolyte salt which can be uniformly distributed within the polymer film. The maximization of the salt concentration is dependent upon the solubility of the salt in the plasticizer and upon the amount of plasticizer which can be used with the polymer without deleteriously affecting the latter's properties. To insure good solubility, the M constituent of the $MX_a$ salt should have a Pauling's electronegativity less than that for X by at least 0.1 units. Salt concentrations in the plasticizer within the range of from about 5% to about 30% of total salt saturation are deemed adequate to excellent for the purposes of this invention.

Besides the plasticizer being a good salt solvent, it has to also maintain its plasticizing function and be highly compatible with and able to maintain a continuous phase throughout the polymer. There are numerous plasticizers which may be used. Suitable plasticizers are exemplified by alkylene glycol alkanoic diesters and by alkylether esters of benzoic acid; terephthalic acid; phthalic acid; and adipic acid. Preferred alkylene glycol alkanoic diesters have the formula:

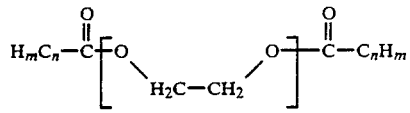

wherein X is a whole integer greater than or equal to 2 but less than or equal to 5, n is a whole integer greater than or equal to 4 but less than or equal to 12, and $m=2n+1$. Of this class of diesters, the compounds 2-ethylhexanoic tetraethylene glycol, 2-ethylheptanoic tetraethylene glycol, 2-ethylhaxanoic triethylene glycol, 2-ethylheptanoic triethylene glycol, and mixtures thereof are especially preferred. These diesters are commercially available from C. P. Hall, Inc., of Chicago, Ill., and are marketed under the name of TEGMER. These plasticizers are suitably present in the polymer film in an amount of from about 30 to about 60 weight percent based upon the total weight of the polymer film.

A preferred plasticizer is an ether ester of terephthalic or adipic acid having the formula:

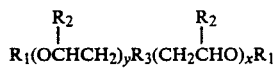

wherein $R_1$ is a phenyl radical or aliphatic hydrocarbon radical of the formula $C_nH_m$ wherein n is an integer of 1 through 8 inclusive and m is equal to $2n+1$: $R_2$ is either hydrogen or a methyl radical; $R_3$ is a terephthalate or adipate radical: X is 2, 3 or 4; and y is 2, 3 or 4. As a general rule, x and y will be equal. Satisfactory results are obtained, however, irrespective of whether x equals y. These ether esters can be produced by the methods disclosed in U.S. Pat. No. 4,620,026, which is incorporated herein by reference. The most preferred ether esters are di(triethylene glycol butyl ether) terephthalate and di(triethylene glycol butyl ether) adipate. When these particular terephthalates and adipates are utilized, they are preferably present in the polymer film in an amount within the range of from about 5 to about 50 weight percent based upon the total weight of the polymer film.

Preferred salt/plasticizer combinations are those in which the salt is $CaI_2$ or LiI and the plasticizer is a di(triethylene glycol butyl ether) ester of terephthalic or adipic acid.

Suitable as the polymer constituent of the polymer film are poly(vinyl chloride), polyurethane, polystyrene, chlorinated polyethylene, poly(vinylidene chloride), poly(ethylene terephthalate), chlorinated butyl rubber and isoprene/styrene/butadiene block copolymers. Both poly(vinyl chloride) and polyurethane are highly preferred. Polyurethane is especially preferred as it possesses adhesive qualities which will allow it to make good electrical contact with collector plates or other conducting surfaces. The polymer films can have a thickness within the range of from about 0.1 to about 10 mils. The thinner polymer films, i.e., those polymer films having a thickness of from about 0.1 to about 1 mil, are preferred as these films provide higher discharge voltages. Further, the thinner films allow for the construction of multicell batteries having a total thickness which is sufficiently small so that a flexible battery is obtained.

As noted previously, the polymer film contains epoxidized vegetable oil. Exemplary of such are epoxidized linseed oil, epoxidized safflower oil, epoxidized soybean oil, epoxidized corn oil, epoxidized cottonseed oil and epoxidized rapeseed oil. Of these, epoxidized soybean oil is preferred. The epoxidized vegetable oil is generally present in the film in an amount within the range of from about 2 wt. % to about 10 wt. % based upon the total weight of the polymer film. A preferred amount is about 5 weight percent.

The polymer film may additionally contain various art-recognized processing aids. For example, solvents, such as, dimethylformamide, tetrahydrofuran, dipropylene glycol and methyl ether acetate, may be used when manufacturing the films of this invention by the solvent casting method. After casting, the solvents should be removed from the films to insure good battery performance. When other methods of film formation are used, other applicable conventional processing aids may be used so long as such do not interfere with the electrolyte function of the polymer film.

As taught in U.S. Pat. No. 4,728,588, when using the solid polyelectrolyte polymer film of this invention to make a secondary battery, graphite is used to conduct electrical charge to the collector plates. The graphite is preferably present as a coating on the polymer film. If used as a coating, then it is applied by conventional techniques, e.g., brushing, spraying, etc.

When the graphite is used as a coating, the coat thickness should be within the range of from about 0.1 to about 10 microns. A preferred thickness is from about 1 to about 5 microns. Further, the graphite should be very fine, i.e., it should have an average particle size within the range of from about 0.1 microns to about 1.0 microns.

The collector plates act to collect the electrons produced by a battery made fro films of solid polyelectrolyte polymers during discharge and to facilitate the application of a recharge voltage to the polymer film during recharge. The collector plates may be graphite, carbon cloth or of metal. When carbon cloth is used, a totally non-metal battery or system is achieved. When of metal, it is preferred that each collector plate be of the same metal. By having both collector plates of the same metal, electrolytic interaction between the plates is avoided. The metal collector plates are preferably foils of aluminum, copper, brass, platinum, silver or gold.

In a preferred form, the secondary battery made using the solid polyelectrolyte polymer film of this invention is a laminate of the above-mentioned polymer film and collector plates. This laminate is constructed so that the polymer film is captured between the two collector plates. The resultant laminate can be held together mechanically or by the use of adhesive. The use of an adhesive requires that the adhesive be selected so that its electronic and ionic conductivity does not interfere with the operation of the secondary battery.

The polymer film of this invention can be prepared conventionally, such as by drawing, extrusion, by plastisol forming or by the solvent casting method. It has been observed that plastisol forming and the solvent casting method give best results. While drawn or extruded films are operative, their discharge voltage capability is not equal to plastisol formed or solvent cast films. When the plastisol forming method is used, it is important to add the electrolyte to the plasticizer and then to add the resultant plasticizer/electrolyte salt solution as an ingredient to the rest of the formulated compound. With this manner of addition, higher salt solubilities are obtained and the formation of salt aggregates is avoided.

A feature of the secondary battery prepared from the solid polyelectrolyte polymer film of this invention is that elevated temperatures are not required to achieve useful discharge voltages, but rather that the subject batteries can be conveniently discharged and recharged at ambient temperatures, e.g., 75° F. (25° C.).

EXAMPLE 1

In a dry box, a 400 ml beaker equipped with a magnetic stirring bar was placed on a magnetic stirrer/heater. To the beaker was added 12 g poly(vinyl chloride), 6 g of 2-ethyl hexanoic acid tetraethyleneglycol (TEGMER 804), 1 g epoxidized soybean oil, followed by the addition of 300 ml of dry N,Ndimethylformamide (DMF). After all of the components dissolved in the DMF, 2.5 g of lithium iodide (LiI) was added. The solution was stirred and heated for about one hour at 40°–50° C. The solution was then divided in half with each half poured into a clear glass plate (25.4 cm×25.4 cm×1.27 cm) which had at least 0.64 cm high silicone rubber boundaries. The plates were first placed in an oven which had been nitrogen purged. The DMF solvent was allowed to evaporate at an oven temperature between 70° and 80° C. After at least 8 hours, the plates and film were placed in a vacuum oven at 30° C. and full vacuum for at least 8 hours. The plates were removed and placed in a box with a nitrogen atmosphere. Each of the films was cut in half and removed from the plates. A thin coating of 1 micronsize graphite particles was painted on one side of the film and then the other. The film with both sides so coated, was laid on top of a sheet of aluminum foil having an 18 gauge copper wire connected thereto. On the other side of the coated film, a like sheet of aluminum foil and wire was then laid. An insulating layer of SARAN film was then laid over the last sheet of aluminum foil to yield a laminate of aluminum sheet/film/aluminum sheet/SARAN film. The resultant laminate was then rolled, SARAN film to the inside, about a dowel to produce a roll which in turn was inserted and placed into an appropriate sized poly(vinyl chloride) shrink tube. Heat was used to shrink the tube, thus forming a tight seal on the laminate with the copper leads exposed, one on each end of the tube. One lead was attached to the anode of a DC power source and the other was attached to the cathode. A charge of ten volts was applied for the desired amount of time until the charging current decreased to 0.1 mA or less. The charged system was discharged through an appropriate resistor and the resultant voltage measured. The discharge voltage was initially 3.2V at open circuit and 2.1V through a 1K ohm resistor. The former discharge voltage was maintained for about 2 hours and then slowly decreased to 0.5V over the next 8 hours. When the discharge voltage became zero, the system was then recharged as described above.

EXAMPLE 2

The procedure in Example 1 was followed except that 2.5 g of $CaI_2$ were substituted for the 2.5 g of LiI used in Example 1. The resultant open circuit discharge voltage was initially 2.8V which decreased to 0.5V over 2 hours. The resultant discharge voltage through the 1.0K ohm resistor was 1.5V which decreased to 0.1V over 1/2 hour.

EXAMPLE 3

The procedure in Example 1 was followed except that instead of 6 g, 8 g 2-ethylhexanoic acid tetraethylene glycol were used to produce the polymer film. The resultant open circuit discharge voltage was initially 3.0V and maintained over 1 hour. The resultant discharge volume through a 1K ohm resistor was 1.86V and slowly decreased to 0.5V over the next 6 hours.

EXAMPLE 4

The procedure in Example 1 was followed except that instead of 2.5 g, 3.0 g LiI were used. The resultant open circuit discharge voltage was maintained at 3.0V for 1 hour. The discharge voltage through a 1K ohm resistor was initially 2.86V and slowly decreased to 0.5V over an 8-hour period.

EXAMPLE 5

The procedure of Example 4 was followed except that instead of 3.0 g, 2.0 g LiI were used. The resultant open circuit discharge voltage was initially 2.9V. The discharge voltage through a 1K ohm resistor was 2.55V and slowly decreased to 0.3V over the next 6 hours.

EXAMPLE 6

The procedure of Example 1 was followed except that conductive carbon cloth was used instead of aluminum foil and copper wire as the electrical contacts. This resulted in a non-metal battery after assembly and charging. The resultant open circuit discharge voltage was 2.5V. The discharge voltage through a 1K ohm resistor was 1.75V which slowly decreased to 0.5V over 6 hours.

EXAMPLE 7

The procedure of Example 1 was followed except: instead of 12 g, 10 g of poly(vinyl chloride) and, instead of 2.5 g LiI, 2.5 g of $CaI_2$ were used; and the graphite was not used as a coating but instead was provided by adding 0.1 g of 1 micron size graphite to the polymer film producing solution. The initial open circuit discharge voltage was 1.865V and the discharge voltage through a 1K ohm resistor was 0.052V and slowly decreased to zero volts over 10 hours.

EXAMPLE 8

A first electronically conductive polymer film was prepared as follows:

A 25 wt. % lithium iodide solution was prepared by adding lithium iodide to di(triethylene glycol butyl ether) terephthalate.

One hundred parts by weight of dispersion grade poly(vinyl chloride) was added to 20 parts by weight epoxidized soybean oil and 33 parts by weight dipropylene glycol methyl ether acetate solvent with mixing. After a substantially homogeneous mix was obtained, 105 parts by weight of 1 micron particle size graphite powder was added thereto with mixing. Then, to this mix was added the di(triethylene glycol butyl ether)-terephthalate 25 wt. % lithium iodide solution with further mixing. The resultant mixture was poured onto a smooth glass plate and a "doctor blade" was used to render a film of about 15 mils thickness. The film was cured in an air blown oven for 15 to 20 minutes at about 125° C.

A second electronically conductive film was prepared in the same manner as was the first, except that, instead of lithium chloride, zinc chloride was used.

An ionically conductive film was prepared by the following procedure. A di(triethylene glycol butyl ether) terephthalate 1 wt. % sodium tetraphenylborate solution was prepared by adding the salt to di(triethylene glycol butyl ether) terephthalate with heating (30° C.) and stirring.

Under mixing, 100 parts by weight of dispersion grade poly(vinyl chloride) was added to 20 parts by weight epoxidized soybean oil and 33 parts by weight dipropylene glycol methyl ether acetate. A homogeneous mix was obtained. To this resultant mixture, the di(triethylene glycol butyl ether)terephthalate 1 wt. % sodium tetraphenylborate solution was added with mixing. This last mix was poured onto a smooth glass plate and reduced to a thickness of about 15 mil with a "doctor blade". The film was cured in an air blown oven for 15 to 20 minutes at about 125° C.

A laminate was then formed to provide a battery. The laminate consisted of: a first, generally square, 9 in2, brass plate of about 2 mils thickness, a coextensive layer of the first electronically conductive polymer; a coextensive layer of the ionically conductive polymer; a coextensive layer of the second electronically conductive polymer; and a second, generally square, 9 in2, brass plate of about 2 mils thickness. The laminae were then mechanically pressed together between two plates of nonconductive material, e.g., plexiglass. An anode lead was connected to the first brass plate and a cathode lead was connected to the second brass plate.

A constant 400 mA, variable voltage DC charging current was applied to the cathode. The voltage varied from 2 volts to 100 volts and was varied to maintain the constant 400 mA value during charging. The initial charge period was 8 hours. Subsequent charge periods took only about 5 hours. The charge battery was discharged through a 10,000 ohm resistor. The discharge voltage was 1.5 volts, the discharge amperage was 200 microamps and the discharge time was 8 hours.

EXAMPLE 9

The same procedure was followed as in Example 8 except that aluminum plates were used instead of brass plates. The resultant charged battery was discharged through a 10,000 ohm resistor and the discharge voltage was 1.5 volts and the discharge amperage was 200 microamps. The discharge time was 8 hours. Thus, no difference was seen between using brass or aluminum plates.

EXAMPLE 10

The procedure of Example 8 was followed except that instead of di(triethylene glycol butyl ether) terephthalate 25 wt. % lithium iodide solution, a di(triethylene glycol butyl ether)terephthalate 25 wt. % copper chloride solution was used.

The battery was discharged through a 10,000 ohm resistor. Discharge voltage was 1 volt while the discharge amperage was 16 microamps. Discharge time was 4 hours.

EXAMPLE 11

The same procedure that was used in Example 10 was followed except that the brass plates were substituted with platinum plates. The discharge values through a 10,000 ohm resistor were essentially the same. Thus, there is little difference seen between the use of brass or platinum plates.

EXAMPLE 12

The same procedure that was used in Example 8 was followed except that a di(triethylene glycol butyl ether)terephthalate 25 wt. % calcium iodide solution was substituted for both the di(triethylene glycol butyl ether)terephthalate 25 wt.% lithium iodide solution and the di(triethylene glycol butyl ether)terephthalate 25 wt. % zinc chloride solution. Discharge through a 10,000 ohm resistor gave a discharge voltage of 3.5 volts and a discharge amperage of 100 microamps. Discharge time was 10 hours.

EXAMPLE 13

The procedure of Example 12 was followed except that aluminum plates were used in place of the brass plates. The discharge values through a 10,000 ohm resistor were essentially identical as those reported in Example 12.

Another illustrative example of the application of solid polyelectrolyte polymer film product is a static dissipative film. A film according to this invention can be coated on one side with graphite and folded with the graphite between the fold. The folded film can then be heat pressed to form a laminate which functions as a static dissipative film. Such films can dissipate a static charge of 5000 volts in 2 seconds or less.

Other applications for the solid polyelectrolyte film of this invention will be readily suggested to those skilled in the art and are included within the scope and spirit of this invention. However, it is desired that the present invention be limited only by the lawful scope of the following claims.

What is claimed is:

1. A solid polyelectrolyte polymer film which features:
   a) a polymer,
   b) a plasticizer for said polymer,
   c) an epoxidized vegetable oil, and
   d) an electrolyte disassociatingly solubilized in said plasticizer, said plasticizer and the solubilized electrolyte being substantially uniformly distributed within said polymer.

2. The solid polyelectrolyte polymer film wherein said electrolyte is selected from the group consisting of a salt having the formula $MX_a$ wherein, M is an alkali metal ion, an alkaline earth metal ion, a zinc ion, a copper ion, a mercury ion or a silver ion, X is a halogen ion or an acetate ion, and a is the oxidation number of M, sodium tetraphenylborate and alkali metal thiocyanates.

3. The solid polyelectrolyte polymer film of claim 1 wherein said electrolyte is a salt having the formula $MX_a$ and X is iodide.

4. The solid polyelectrolyte polymer film of claim 3 wherein M is selected from the group consisting of Zn, alkali metals and alkaline earth metals.

5. The solid polyelectrolyte polymer film of claim 3 wherein $MX_a$ is $CaI_2$.

6. The solid polyelectrolyte polymer film of claim 3 wherein $MX_a$ is LiI.

7. The solid polyelectrolyte polymer film of claim 1 wherein said plasticizer is an alkyl ether ester of an acid selected from the group consisting of benzoic acid, terephthalic acid, phthalic acid, adipic acid and mixtures thereof.

8. The solid polyelectrolyte polymer film of claim 1 wherein said plasticizer is selected from the group consisting of: an alkyl ether ester having the formula,

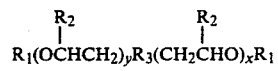

wherein $R_1$ is a phenyl radical or aliphatic hydrocarbon radical of the formula $C_nH_m$ wherein n is an integer of 1 through 8 exclusive and m is equal to $2n+1$, $R_2$ is either hydrogen or a methyl radical, $R_3$ is a terephthalate or adipate radical, x is 2, 3 or 4, y is 2, 3 or 4; ad an alkylene glycol alkanoic diester of the formula.

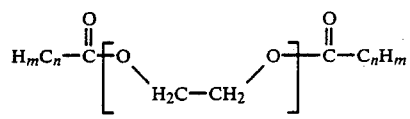

wherein X is a whole integer greater than or equal to 2 but less than or equal to 5, n is a whole integer greater than or equal to 4 but less than or equal to 12, and $m=2n+1$.

9. The solid polyelectrolyte polymer film of claim 8 wherein said plasticizer is di(triethylene glycol butyl ether) terephthalate.

10. The solid polyelectrolyte polymer film of claim 9 wherein said plasticizer is present in an amount within the range of from about 5 to about 50 weight percent based upon the total weight of said polymer film.

11. The solid polyelectrolyte polymer film of claim 8 wherein said plasticizer is di(triethylene glycol butyl ether) adipate.

12. The solid polyelectrolyte polymer film of claim 11 wherein said plasticizer is present in an amount within the range of from about 5 to about 50 weight percent based upon the total weight of said polymer film.

13. The solid polyelectrolyte polymer film of claim 5 wherein said plasticizer is di(triethylene glycol butyl ether) terephthalate.

14. The solid polyelectrolyte polymer film of claim 5 wherein said plasticizer is di(triethylene glycol butyl ether) adipate.

15. The solid polyelectrolyte polymer film of claim 6 wherein said plasticizer is di(triethylene glycol butyl ether) terephthalate.

16. The solid polyelectrolyte polymer film of claim 6 wherein said plasticizer is di(triethylene glycol butyl ether) adipate.

17. The solid polyelectrolyte polymer film of claim 1 wherein said electrolyte is sodium tetraphenylborate.

18. The solid polyelectrolyte polymer film of claim 1 wherein said electrolyte is sodium thiocyanate.

19. The solid polyelectrolyte polymer film of claim 1 wherein said polymer is selected from the group consisting of poly(vinyl chloride), polyurethane, polystyrene, chlorinated polyethylene, poly(vinylidene chloride), poly(ethylene terephthalate), chlorinated butyl rubber and isoprene/styrene/butadiene block polymers.

20. The solid polyelectrolyte polymer film of claim 1 wherein said polymer is poly(vinyl chloride).

* * * * *

UNITED STATES PATENT AND TRADEMARK OFFICE
CERTIFICATE OF CORRECTION

PATENT NO. : 5,057,565

DATED : October 15, 1991

INVENTOR(S) : Stephen A. Noding and Sanford A. Siegel

It is certified that error appears in the above-identified patent and that said Letters Patent is hereby corrected as shown below:

On the cover page, after "App. No.:", delete "283,744" and insert -- 288,744 -- therefor.

Signed and Sealed this

Sixth Day of April, 1993

Attest:

STEPHEN G. KUNIN

*Attesting Officer*  *Acting Commissioner of Patents and Trademarks*